Jan. 31, 1961
S. C. LASHUA ET AL
2,970,070
COATED METAL ARTICLES
Filed April 25, 1958
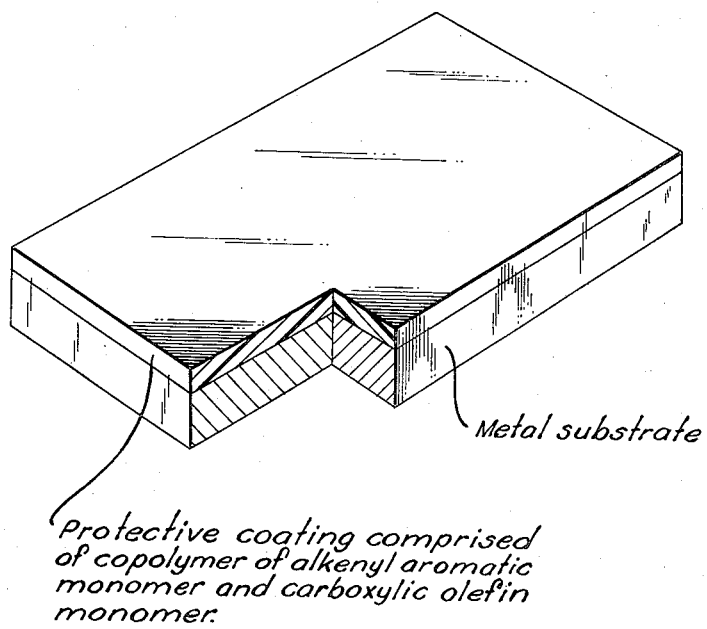
Metal substrate
Protective coating comprised of copolymer of alkenyl aromatic monomer and carboxylic olefin monomer.
INVENTORS.
Sherman C. Lashua
William K. Schweitzer, Jr.
BY Jerome Rudy
ATTORNEY United States Patent Office 2,970,070
Patented Jan. 31, 1961

2,970,070
COATED METAL ARTICLES

Sherman C. Lashua and William K. Schweitzer, Jr., Midland, Mich., assignors to The Dow Chemical Company, Midland, Mich., a corporation of Delaware Filed Apr. 25, 1958, Ser. No. 730,852

9 Claims. (Cl. 117—132)

The present invention is concerned with, and has principally amongst its objectives, the provision of useful protective coatings for and on metal sufaces, which coatings provide a strong, tough, tighly-adhering layer, having good water and other chemical resistance, and are comprised of a resinous copolymer of a monoalkenyl aromatic monomer with a monomeric carboxylic olefin. The invention has reference to both a method for coating metal surfaces with the beneficial coatings and to the coated articles thereby obtained.

According to the invention, a metal surface may advantageously be protectively coated by a method which comprises applying to the surface a solution of a thermoplastic resinous copolymer of a monoalkenyl aromatic monomer with a monomeric carboxylic olefin dissolved in a solvent vehicle therefor, then removing the solvent vehicle in which the copolymer was dispersed, either by permitting it to evaporate in air or under the influence of baking at an elevated temperature, in order to leave a continuously deposited resin coating layer on the metal surface.

The resin coatings that are obtained by practice of the present invention are generally smooth, hard, tough, water-insoluble layers that are tightly bonded to the surface of the metal. They have exceptional resistance to most chemicals and solvents, including acids, alkalies and saline solutions. As a consequence, they are well adapted to provide excellent protection from corrosion for the surface of the metal. Their physical characteristics are such that they are quite scratch resistant and difficult to mar. Unless they have been purposely pigmented or colored, they provide an attractive varnish-like coating on the metal surface that is transparent and superior in properties to many conventionally obtainable lacquer coatings for metals. A coated metal surface prepared in accordance with the present invention is schematically illustrated, partly in broken-out cross-section, in the sole figure of the hereto annexed drawing.

It is beneficial for the resinous copolymer that is employed as a protective coating in the practice of the present invention to contain in the polymer molecule between about 80 and 99 weight percent, preferably between about 80 and 95 weight percent, of the monoalkenyl aromatic monomer that is polymerized with the monomeric carboxylic olefin. Advantageously, the average molecular weight of the resinous copolymer that is employed is between about 150,000 and 500,000, as determined by light-scattering techniques. It is frequently of great benefit to employ a copolymer which is adapted, when dissolved in the amount of about 10 percent by weight (based on the weight of the resulting solution) in methyl ethyl ketone, to provide solutions having viscosities at about 25° C. between about 5 and 20 centipoises.

Preferably, the resinous copolymer that is employed is one that is free from gels and primary cross-links.

Of the various monoalkenyl aromatic monomers that may be employed in the practice of the invention, it is generally of great advantage to utilize styrene. If desired, however, other monoalkenyl aromatic monomers may be employed in place of or in combination with styrene. These include such other monomeric alkenyl aromatic compounds as para-methyl styrene (vinyl toluene), meta-ethyl styrene, ortho-para-dimethyl styrene, ortho-para-diethyl styrene, para-chloro styrene and the several other mono and dichloro styrenes such as ortho-para-dichloro styrene, isopropyl styrene, ortho-methyl-para-isopropyl styrene, comonomeric mixtures of styrene with α-methyl styrene as well as α-methyl styrene alone, and the like. Thus, the term "monoalkenyl aromatic monomer," as herein employed, is intended to include the compounds of the indicated class which have either a vinyl radical or anisopropenyl radical directly attached to a carbon atom of an aromatic nucleus of the benzene series. Such monomers may be represented by the general formula $CH_2=CRAr$, in which R is hydrogen or methyl and Ar is an aromatic radical of the benzene series containing from 6 to about 10 carbon atoms The monomeric carboxylic olefins that can be copolymerized with monoalkenyl aromatic hydrocarbons to form the resinous copolymers used in the practice of the present invention include acidic monomers of the type described which contain a carboxylic acid group and from 3 to 4 carbon atoms in their molecules Advantageously, the monomeric carboxylic olefins that are utilized are acrylic and methacrylic acid, although various other substituents in place of a methyl group may be employed on the α-carbon atom. The monomeric carboxylic olefins used are of the general formula: $H_2C=CG-COOH$, in which G is hydrogen, methyl, nitrile (—CN), or a halogen of atomic number 9 to 35 (i.e., fluorine, bromine and preferably chlorine).

When applicating solutions of the copolymers are employed it is generally advantageous for the liquid dispersed formulation of the resin, to be prepared or made up so as to contain between about 1 and 40 percent by weight, preferably from about 10 to 30 percent by weight, of the polymer. Application of such a solution can be made by brushing, spraying or dipping techniques at room temperature or above, depending on polymer concentration in the solution and the particular solvent system utilized for its preparation. Applicating solutions of the copolymers can be made with such solvents as acetone, n-butyl-acetate, ethyl acetate, methyl ethyl ketone, methyl isopropyl ketone, dimethyl formamide and the like or mixtures thereof. As is apparent the amount of such applicating formulation that is spread over the surface being coated depends upon its solids content and the thickness that is desired in the finally obtained resin coating. This, of course, may be varied in the conventional manner to meet the requirements of particular situations. Ordinarily, satisfactory results may be obtained when the thickness of the finally obtained coating is between about 0.1 and 10 mils. In many cases, it may be more desirable for the surface coating to be prepared so as to have a minimum average thickness of at least about 1 or 2 mils and a maximum average thickness not greater than about 5 mils.

In most cases, it is satisfactory to employ the dissolved resin in and of itself as the coating formulation. However, if desired, various filler materials such as kaolin or china clay and the like (with or without coloring agents) may also be incorporated in the formulations to provide specific decorative coatings for the surfaces. The amount of such filler ingredients that is employed may be varied in the conventional manner for particular applications. Generally, however, a minor proportion between about 10 and 25 percent by weight, based on the weight of the applicating solution is found to be suitable.

The applied coating may be dried, as indicated in the foregoing, by permitting it to stand in the air at ambient room temperature or by baking it on the metal surface. The drying time, as will be apparent to those skilled in the art, is dependent on the applicating and drying techniques employed and the solvent system utilized. Thus, air drying ordinarily requires much longer periods than baking. For example, using about 15 percent solution of the resin in such a solvent as methyl ethyl ketone, the composition may be air dried at room temperatures in periods of time that usually run no longer than 24 hours and which frequently are considerably shorter. Baking of such a composition at 150° C. requires only about 5 minutes while baking at 225° C. generally requires less than 5 minutes.

As will be appreciated by those skilled in the art, best results are obtained when the metal surface being coated is efficiently cleaned of any rust, scale, dirt or other contaminants before application of the coating is made. This can be accomplished by wiping or brushing or by use of chemical and/or solvent treating and cleaning agents for the surface.

Care should be taken in the practice of the invention to avoid use of too thin a solution of the polymer which may necessitate repeated applications in order to obtain a suitable continuous coating thickness. Too thick a solution, such as one that contains more than 40 percent of the resin, frequently causes difficulties due to excessive viscosity and may prevent achievement of an even coating thickness. This may lead to or result in poor or inadequate drying performance.

Any metal normally employed for structural and fabrication purposes may advantageously be coated in the practice of the present invention. Thus, iron and steel and aluminum may be so protected. Exceptionally beneficial results, however, are obtained when the present invention is practiced in order to provide protective coatings on magnesium and magnesium alloys.

In order to further illustrate the invention, a 15 percent solution of a copolymer of styrene and acrylic acid in methyl ethyl ketone was prepared. The copolymer contained 90 weight percent of styrene and 10 weight percent of acrylic acid copolymerized in its molecule and has an average molecular weight of about 210,000. The solution was applied to a thin magnesium alloy sheet substrate (that had previously been treated with an acetic nitrate pickle and air dried) by dipping the magnesium sheet in the solution and withdrawing it at a rate of about 2 inches per minute. The size of the thin magnesium sheet was about 2½ by 1¾ inches. The coating was then air dried for 24 hours at room temperature. An excellent, continuously applied protective coating was thereby obtained having an average thickness of about 0.25 mil. When the coated magnesium sheet was immersed in 5 percent aqueous sodium chloride solution for 7 days, complete protection from corrosion was found to have been achieved. Similar results were obtained when the foregoing was repeated excepting to bake the applied coating on at temperatures of either 150° C. or 225° C. for 5 minutes. Similar excellent results were also obtained when the coating was prepared with a copolymer of styrene and methacrylic acid having a 86/14 respective weight percent composition and an average molecular weight of about 225,000. Excellent results were also obtained when the foregoing was repeated with either copolymer using n-butyl acetate as the solvent.

The foregoing was also repeated with both of the indicated resins to coat aluminum sheet and mild steel sheet in the indicated manner. Prior to coating, both of the metals were surface cleaned with carbon tetrachloride and the applicating solutions were brushed on to their surfaces. Better results were obtained in the case of the aluminum sheet when it was pre-treated with carbon tetrachloride, immersed in 10 percent aqueous sodium hydroxide for one minute, washed with water, dipped in 10 percent hydrochloric acid for one minute, rinsed with water, and air dried prior to coating. The aluminum sheet pre-treated in the indicated manner was found to have better adhesion of the applied coating. In all cases, the coatings were found to have little tendency to scale, as determined by making a series of closely spaced cuts on the coating with a knife and observing the tendency of the coating to peel off beneath them. The applied coatings were also found to have excellent continuity, as determined by placing drops of 10 percent aqueous sodium hydroxide on the coated pieces of aluminum and looking for a reaction with the metal. Only in places where deliberate scratches were made through the coating did any such reaction occur.

Similar results are obtained in the practice of the present invention using any other of the resinous copolymers indicated to be within its scope for providing the protective coatings on the metal surfaces.

What is claimed is:

1. A method for protectively coating a metal surface which comprises applying to the surface a solution of a thermoplastic resinous copolymer having an average molecular weight in the range from about 150,000 to about 500,000 and consisting essentially of (a) from about 80 to 99 weight percent, based on the weight of the copolymer, of a monoalkenyl aromatic monomer of the formula: $CH_2=CRAr$, wherein R is selected from the group consisting of hydrogen and methyl and Ar is an aromatic radical of the benzene series containing from 6 to about 10 carbon atoms, and (b) from about 20 to 1 weight percent, based on the weight of the copolymer, of a monomeric carboxylic hydrocarbon olefin of the formula: $H_2C=CG—COOH$, wherein G is selected from the group consisting of hydrogen, methyl, nitrile, and halogens of atomic number from 9 to 35; then drying the solvent from said applied solution to deposit a continuous coating layer of said resinous copolymer on said metal surface.

2. The method of claim 1, wherein said metal surface is comprised of magnesium.

3. The method of claim 1, wherein said solution contains between about 1 and 40 percent by weight of said resinous copolymer.

4. The method of claim 1, wherein said solution contains between about 20 and 30 percent by weight of said resinous copolymer.

5. As an article of manufacture a metal object having a protective coating on its surface that is comprised of a layer of a thermoplastic resinous copolymer having an average molecular weight in the range from about 150,000 to about 500,000 and consisting essentially of (a) from about 80 to 99 weight percent, based on the weight of the copolymer, of a monoalkenyl aromatic monomer of the formula $CH_2=CRAr$, wherein R is selected from the group consisting of hydrogen and methyl and Ar is an aromatic radical of the benzene series containing from 6 to about 10 carbon atoms, and (b) from about 20 to 1 weight percent, based on the weight of the copolymer, of a monomeric carboxylic hydrocarbon olefin of the formula: $H_2C=CG=COOH$, wherein G is selected from the group consisting of hydrogen, methyl, nitrile, and halogens of atomic number from 9 to 35.

6. The article of claim 4, wherein said coating has a thickness between about 0.1 and 10 mils.

7. The article of claim 4, wherein said resinous copolymer in said coating contains between about 95 and 80 weight percent of said monoalkenyl aromatic monomer.

8. The article of claim 6, wherein said resinous copolymer in said coating is a copolymer of styrene and acrylic acid.

9. The article of claim 6, wherein said resinous copolymer in said coating is a copolymer of styrene and methacrylic acid.

References Cited in the file of this patent

UNITED STATES PATENTS

| | | |
|---|---|---|
| 1,933,052 | Fikentscher et al. | Oct. 31, 1933 |
| 2,760,886 | Prentiss | Aug. 28, 1956 |
| 2,866,767 | Fang | Dec. 30, 1958 |

FOREIGN PATENTS

| | | |
|---|---|---|
| 371,396 | Great Britain | Apr. 14, 1932 |